July 14, 1931.  I. CORCORAN  1,813,914
RELEASE MECHANISM
Filed Sept. 26, 1930  2 Sheets-Sheet 1
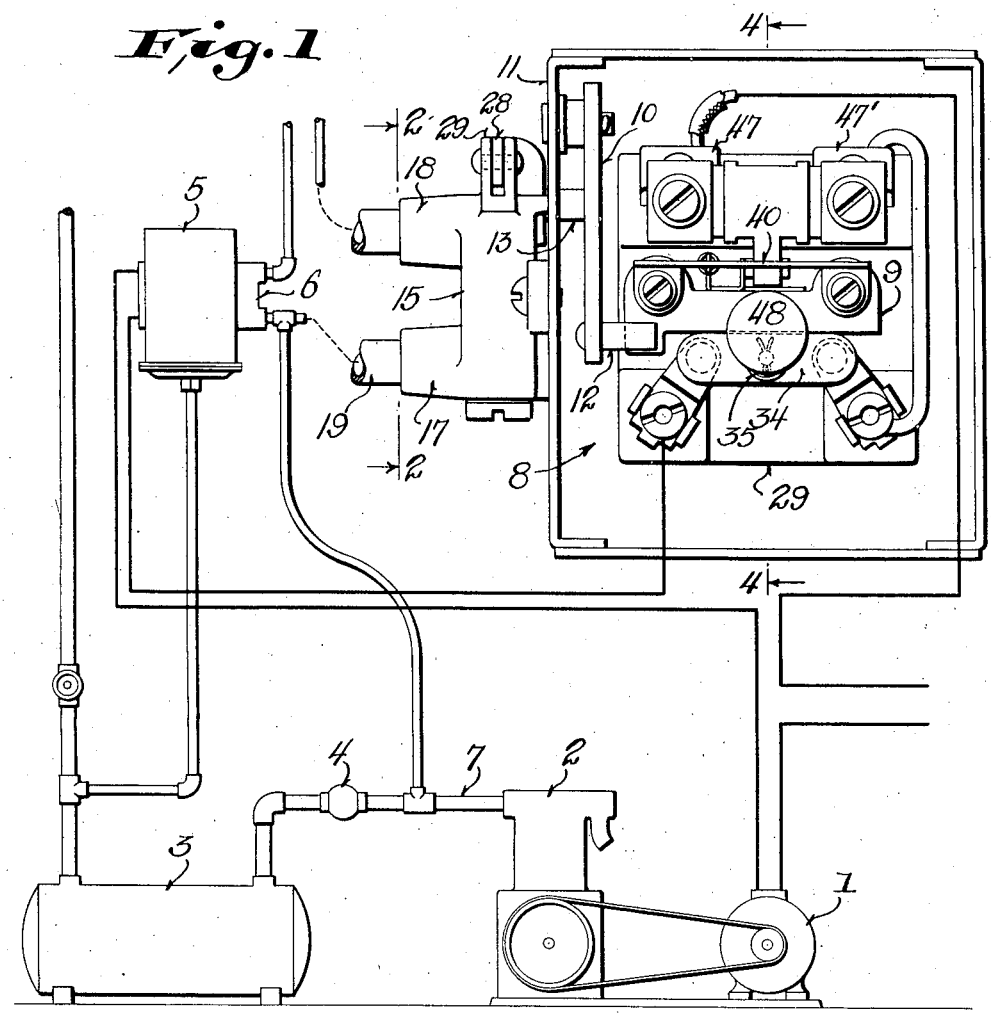
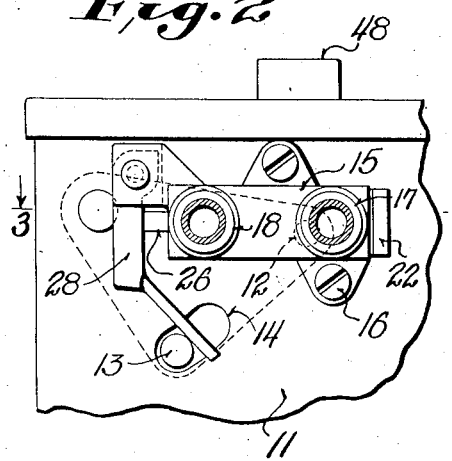
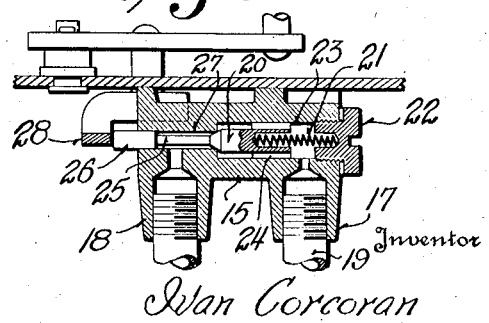
Inventor
Ivan Corcoran
By Arthur R. Woolfolk
Attorney July 14, 1931.   I. CORCORAN   1,813,914
RELEASE MECHANISM
Filed Sept. 26, 1930     2 Sheets-Sheet 2
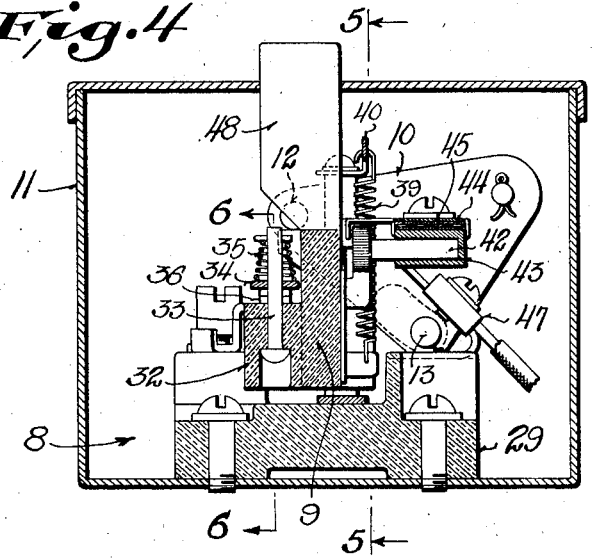
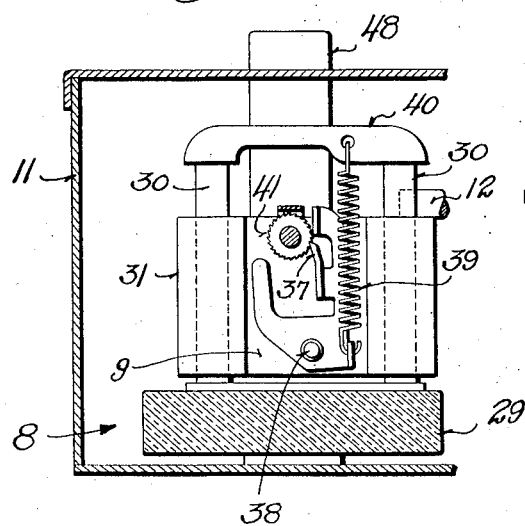
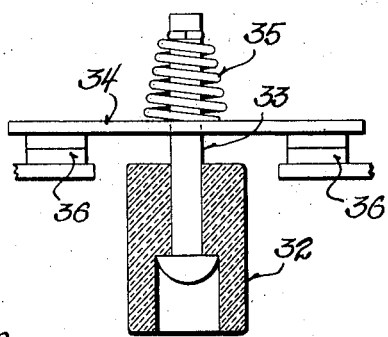
Inventor
Ivan Corcoran
By Arthur R. Woolfolk, Attorney Patented July 14, 1931

1,813,914

UNITED STATES PATENT OFFICE

IVAN CORCORAN, OF MILWAUKEE, WISCONSIN, ASSIGNOR TO SQUARE D COMPANY, OF DETROIT, MICHIGAN

RELEASE MECHANISM

Application filed September 26, 1930. Serial No. 484,694.

This invention relates to release mechanism for motor driven compressors.

When compressors such as air compressors are driven by electric motors, it frequently happens that the motor becomes overloaded and the circuit breaker controlling the motor circuit opens, due to the overload of the motor. Thereafter, when the motor is again started, it has to drive the compressor against full pressure while the motor is starting. This obviously is a highly disadvantageous condition and causes a needless loading of the motor and a needless load to be thrown upon the line for the mere starting of the motor. If the motor is allowed a slight interval before full load is thrown upon it, obviously the starting conditions are very much easier.

This invention is designed to overcome the defects noted above and objects of this invention are to provide a novel form of release mechanism operated by a circuit breaker in the electric motor circuit and associated with a compressor driven by the motor so that the pressure against which the compressor operates is relieved whenever the motor circuit is open, to thereby facilitate starting.

Further objects are to provide a release system which is particularly applicable to electrically driven compressors, such as air compressors, and which is so organized that whenever either the circuit breaker or the pressure control switch operates, that not only the motor circuit is open, but also the pressure between the compressor and the storage tank, or other apparatus is relieved, so that a wholly automatic means is provided for relieving the motor from the excessive starting load, heretofore normally imposed, under all conditions under which the motor may be stopped.

A further object of this invention is to provide a combined circuit breaker and release valve, which may be installed as a unit and which is highly reliable in its operation and requires no thought on the part of the operator.

Further objects of this invention are to provide an attachment in the form of a release valve, which may be applied to existing types of circuit breakers with a minimum of change in construction and without requiring the discarding of the circuit breakers now in use.

An embodiment of the invention is shown in the accompanying drawings, in which:—

Figure 1 is a schematic view showing the system in which the release mechanism is used, and showing in plan view a circuit breaker and release valve.

Figure 2 is a fragmentary sectional view on the line 2—2 of Figure 1.

Figure 3 is a sectional view on the line 3—3 of Figure 2.

Figure 4 is a sectional view on the line 4—4 of Figure 1.

Figure 5 is a fragmentary sectional view on the line 5—5 of Figure 4.

Figure 6 is an enlarged fragmentary sectional view on the line 6—6 of Figure 4.

Referring to Figure 1, it will be seen that a system has been shown in which an electric motor 1 drives an air compressor 2, which supplies a storage tank 3, a check-valve 4 being interposed between the air compressor and the storage tank.

A pressure control switch 5 is connected in the motor circuit and operates in any well known manner. This pressure control switch may be provided with a release valve 6, which is connected to the intermediate pipe 7 between the air compressor 2 and the check-valve 4. This release valve 6 may be of any form, such as that hereinafter described in specific relation to the circuit breaker. It is adapted when the motor circuit is opened by the pressure control valve, indicated generally at 5, to discharge the compressed air from the pipe 7 between the compressor and the check-valve, to thereby relieve the motor of the necessity of driving the air compressor against pressure during the starting period.

For example, when the pressure rises to a predetermined point, the automatic pressure switch operates, opening the motor circuit, and also releasing the pressure against which the compressor normally operates.

A circuit breaker, indicated generally by the reference character 8, is also provided and located in the motor circuit. Any form of circuit breaker can be employed in the broadest aspect of this invention. As a matter of fact, a thermally actuated circuit breaker has been shown, as will hereinafter appear.

Under all forms of the invention, the circuit breaker is provided with a movable member 9, which is released by overload and moves from switch closed to switch open position. Within the path of movement of this movable member a valve actuating member is positioned and is adapted to be operated by the movable member of the circuit breaker.

The valve actuating member may take various forms. In the form chosen for illustration, a lever 10 is pivoted to the casing 11 of the circuit breaker, and is provided with a pin 12, which is in the path of movement of the movable member 9, and is raised by such movable member when the circuit breaker opens. The lever 10 is provided with a pin 13, which projects through an arcuate slot 14 in the casing of the circuit breaker, as shown most clearly in Figure 2.

A release valve 15 is provided and may be attached by means of screws 16 to the outer side of the circuit breaker casing, as shown clearly in Figure 2. This release valve has an inlet portion 17 and an outlet portion 18, the outlet portion communicating with the external air. The inlet portion 17 is connected by means of a pipe 19, with the piping leading to the intermediate pipe 7 between the air compressor 2 and the check-valve 4, as shown in Figure 1.

It is obvious from the invention as thus far described, that when the circuit breaker opens, the release valve 15 opens and relieves the pressure against which the air compressor operates, thereby permitting restarting of the motor without load.

The release valve 15 may take various forms, one form having been chosen for the purpose of illustration and shown, in section, in Figure 3. This release valve may consist of a plunger valve 20, which is recessed and houses a spring 21, the rear end of the spring seating within a recess formed in a closure plug 22, which latter closes the main bore or opening 23 in the body of the valve. Any suitable means may be provided for guiding the plunger valve while permitting fluid to flow around said valve. As shown in Figure 3, the plunger may have guiding fins or projections 24 formed integrally thereon.

The plunger valve is provided with a neck 25, which joins an outwardly extending plunger 26, which freely slides through a small aperture 27 formed in the body of the valve.

The outlet portion 18 communicates with the aperture 27, and the inlet portion 17 communicates with the main bore 23 of the valve. A shoulder is formed at the point where the bores 23 and 27 join, and the valve may be made conical and may seat at such shoulder, as shown in Figure 3.

The plunger is engaged by an intermediate portion of a lever 28, which is pivotally mounted between lugs 29 formed integrally with the valve body, as shown in Figure 1. This lever 28 extends downwardly and transversely across the path of movement of the pin 13, as may be seen from Figure 2, so that when such pin is moved upwardly by the rocking of the lever 10, the release valve is opened, that is to say, communication is established between the inlet 17 and the outlet portion 18.

The valve may loosely fit within the bore 23 and may therefore align itself properly with its seat so that secure seating is obtained. Obviously other types of valves could be substituted for the one shown without departing from the invention in its broadest aspect.

The circuit breaker may be of the magnetically released or the thermally released type. However, for the sake of illustration, the circuit breaker is shown as of the thermally released type. This construction is also desirable as it provides a slightly delayed operation, so that an instantaneous overload lasting only momentarily, will not open the circuit breaker.

The circuit breaker may comprise an insulating base 29, which carries guiding standards 30, upon which the insulating block or movable member 9, provided with guiding portions 31, is adapted to travel. This insulating block is provided with a projecting portion 32, which carries a pin 33 upon which the movable contact member 34 is loosely mounted. This contact member is urged downwardly into engagement with the lug or projection 32 by means of a spring 35. However, when the circuit breaker is closed, the movable contacts engage the stationary contacts 36 and compress the spring 35. In other words, a freely floating movable contact member is provided.

A latch 37 is pivotally mounted, as indicated at 38, upon the movable block or movable member 9, and is rocked in a counter-clockwise direction by means of a tension spring 39, secured at one end to the latch and at the other end to a transverse stationary member 40 joining the uprights 30. When the circuit breaker is in closed position, as shown in Figure 5, for instance, the latch 37 engages one of the teeth of a ratchet wheel 41. This ratchet wheel is provided with a rigidly mounted stem 42 and constitutes a portion of the thermally actuated unit. The stem 42 loosely fits within a metal socket 43, see Figure 4, and is soldered in place by means of a low melting point alloy.

The socket block 43 is clamped to a pair of insulating strips of mica or other material, as indicated at 44 in Figure 4, between which a heating element 45 is located. This heating element is connected at opposite ends to the contacts 47 and 47', see Figure 1. This thermal unit constitutes a self-soldering unit and operates in a well known manner, that is to say, the solder or fusible alloy melts when an excessive current passes through the heating unit 45, and the ratchet wheel 41 is therefore allowed to rotate, thus allowing the catch 37 to move upwardly and consequently allowing the movable member 9 to move upwardly, thereby opening the circuit.

Any suitable means may be provided for resetting the circuit breaker, for instance, the movable member 9 may be provided with a push button or plunger 48, see Figures 1, 4 and 5, which projects upwardly through the casing of the circuit breaker.

It is to be distinctly understood that the circuit breaker may take other forms from that shown, and that the thermally actuated circuit breaker, although preferred for certain types of service, is not the only type applicable to this invention.

It will be seen that this invention contemplates a motor driven compressor equipped with a circuit breaker, which not only opens the circuit of the motor, but also relieves the pressure against which the compressor must operate during the restarting of the motor.

Further, it will be seen that the invention contemplates not only a release associated with the circuit breaker, but also a release associated with a pressure control switch so that under all conditions the motor may start in an unloaded condition.

It will be seen further that the release valve associated with the circuit breaker may be applied to circuit breakers already installed with a minimum of change and with very little effort.

Although this invention has been described in considerable detail, it is to be understood that such description is intended as illustrative rather than limiting, as the invention may be variously embodied and is to be interpreted as claimed.

I claim:—

1. In a release mechanism, the combination of a circuit breaker biased towards open position and including means for closing said circuit breaker, means for holding said circuit breaker temporarily in closed position, means responsive to load conditions for releasing said circuit breaker, and a pressure relief valve opened by said circuit breaker when said circuit breaker moves towards open position.

2. In a release mechanism, the combination of a circuit breaker biased towards open position and including means for closing said circuit breaker, means for holding said circuit breaker temporarily in closed position, means responsive to load conditions for releasing said circuit breaker, and a pressure relief valve mechanically opened by said circuit breaker when said circuit breaker moves towards open position.

3. In a release mechanism, the combination of a circuit breaker comprising a movable member, circuit closing means operated by said movable member, means biasing said movable member towards open position, means for moving said movable member to closed position, means for temporarily holding said movable member in closed position and responsive to load conditions to automatically release said member, a pressure relief valve, and mechanism mechanically actuated by said movable member for opening said valve when said movable member is released.

4. In a release mechanism, the combination of a circuit breaker comprising a movable member, circuit closing means operated by said movable member, means biasing said movable member towards open position, means for moving said movable member to closed position, means for temporarily holding said movable member in closed position and responsive to load conditions to automatically release said member, a pressure relief valve, and mechanism located in the path of travel of said movable member and mechanically actuated by said movable member for opening said valve when said movable member is released.

5. A mechanism for automatically controlling an electrically driven air compressor comprising means responsive to the electrical load for simultaneously opening an electric circuit and a relief valve.

6. An automatic system comprising an electric motor provided with a supply circuit, a compressor driven by said electric motor, a pressure responsive switch for opening the motor circuit under predetermined pressure conditions, a circuit breaker for opening the motor circuit under predetermined load conditions, and pressure relief means for relieving the pressure against which said compressor works whenever either the pressure switch or circuit breaker responds to the respective conditions.

In testimony whereof, the signature of the inventor is affixed hereto.

IVAN CORCORAN.